UNITED STATES PATENT OFFICE.

WILLIAM HOSKINS, OF CHICAGO, ILLINOIS.

CORE COMPOUND.

1,392,013. Specification of Letters Patent. Patented Sept. 27, 1921.

No Drawing. Application filed June 27, 1921. Serial No. 480,862.

*To all whom it may concern:*

Be it known that I, WILLIAM HOSKINS, a citizen of the United States, residing at Chicago, in the county of Cook and State of Illinois, have invented a new and useful Improvement in Core Compounds, of which the following is a specification.

My invention relates to certain new and useful improvements in core compounds and is fully described and explained in the specification.

It has heretofore been common practice to use as a core compound the waste from sulfite liquor from spruce treatment, concentrated to about 30° Baumé gravity. Linseed oil and other oils such as cotton seed, corn, china wood, etc., have also been extensively used for this purpose. Each of these classes of materials has certain specific advantages and certain disadvantages. A great many efforts have been made to combine these two known materials, sulfite liquor and oil, for the purpose of providing a new composition having the advantages of both, and particularly to avoid the objection that a concentrated sulfite liquor is hygroscopic when evaporated to dryness and that cores made with it tend to collect moisture with obviously undesirable results to the castings.

I have discovered that a highly advantageous core compound can be made at a low price by adding to these ingredients an emulsifying agent, so that they are held together as a relatively permanent emulsion. My preferred compound consists of equal parts of raw linseed oil and the waste sulfite liquor from spruce evaporated to about 30° Baumé gravity, to which is added about 5% of ammonia soap made by saponifying oleic acid with ammonia. I prefer this emulsifying agent as at present advised because it can be saponified at low temperature, and because under heat it is largely dissipated from the core. These several ingredients are vigorously agitated and a permanent emulsion is formed which is a highly effective, convenient and desirable core compound.

I claim:

1. The herein described core compound comprising raw linseed oil, concentrated waste sulfite liquor and an emulsifying agent in the form of a substantially stable emulsion.

2. The herein described core compound comprising a relatively permanent emulsion with substantially equal parts of raw linseed oil and concentrated waste sulfite liquor and an emulsifying agent.

3. The herein described core compound comprising a substantially stable emulsion of about equal parts of raw linseed oil, concentrated waste sulfite liquor and as an emulsifying agent an ammonia soap.

4. The herein described core compound comprising a substantially stable emulsion of about equal parts of raw linseed oil, concentrated waste sulfite liquor and as an emulsifying agent ammonium oleate.

5. The herein described core compound comprising a relatively permanent emulsion of oil, concentrated sulfite liquor and an emulsifying agent.

In testimony whereof I have hereunto set my hand and seal this 25th day of June, 1921.

WILLIAM HOSKINS. [L. S.]